United States Patent

Kornylak

[15] 3,664,482

[45] May 23, 1972

[54] VERTICAL CHAIN TYPE CONVEYOR WITH TILTING SHELVES

[72] Inventor: Andrew T. Kornylak, 400 Heaton Street, Hamilton, Ohio 45011

[22] Filed: Apr. 24, 1970

[21] Appl. No.: 31,602

[52] U.S. Cl................................................198/20, 198/138
[51] Int. Cl........................................................B65g 47/00
[58] Field of Search....................198/20, 158, 157, 137, 138

[56] References Cited

UNITED STATES PATENTS

| | | | |
|---|---|---|---|
| 1,135,316 | 4/1915 | Olson | 198/157 X |
| 2,704,614 | 3/1955 | St. John et al. | 198/157 X |
| 3,100,041 | 8/1963 | Sheehan, Sr. | 198/158 |
| 3,365,052 | 1/1968 | Kornylak | 198/158 |

Primary Examiner—Evon C. Blunk
Assistant Examiner—Hadd S. Lane
Attorney—Thomas E. Beall, Jr.

[57] ABSTRACT

A conveyor for transporting loads between vertically spaced stations. A plurality of shelves are pivotally connected to a pair of chains which are power driven to carry the shelves to the stations. The shelves are tilted at the unloading station for gravity discharge of the load from the front and are tilted in the opposite direction at the loading station to slide the load toward the rear to prevent escape from the front during transport. Guide devices are provided at the tilting axis to prevent deflection of the chain by the tilting forces.

5 Claims, 5 Drawing Figures

INVENTOR.
ANDREW T. KORNYLAK
BY
Harold L. Halpert
AGENT

INVENTOR.
ANDREW T. KORNYLAK
BY Harold L. Halpert
AGENT

INVENTOR.
ANDREW T. KORNYLAK
BY Harold L. Halpert
AGENT

VERTICAL CHAIN TYPE CONVEYOR WITH TILTING SHELVES

This invention relates to a conveyor and particularly to an improved mechanism for use in loading and unloading a vertical conveyor.

In my U.S. Pat. Nos. 2,747,724 and 3,365,052 I disclose vertical conveyors in which shelves or trays are moved in a continuous orbit by a chain and sprocket mechanism. In the load carrying portion of the orbit the shelves are horizontal. In the return portion of the orbit the shelves are vertical. In order to provide for the shifting of the shelves from the horizontal and vertical positions the shelves are pivoted about an axis carried in the chains by bell crank levers which operate in trackways adjacent opposite ends of the shelves. It has been customary to load and unload the shelves by tilting a separate loader-unloader unit adjacent the conveyor at each loading and unloading station to either slide the load onto the shelf or receive the load from the horizontal shelf. In my U.S. Pat. No. 2,747,724 I show a vertical conveyor in which a shelf is tilted at the loading and unloading stations to receive and discharge the articles which constitute the conveyor load. This arrangement eliminates the use of a separate loader-unloader unit at each station but is faulty in operation because the tilting forces deflect the chain and introduce an unpredictable shelf tilt. It is therefore an object of this invention to provide an apparatus as aforesaid in which the deflection of the chain is controlled to provide a shelf tilt that is exact and predictable.

It is a further object of this invention to produce a conveyor as aforesaid in which the self is tilted in a manner to facilitate movement of the packages on and off the shelves in a smooth shock free manner.

These and other objects of the invention will become manifest upon reading the following description in conjunction with the accompanying drawings wherein.

In accordance with the invention a guide roller is mounted adjacent the opposite sides of the shelf on the pivot axis and a rollerway is provided for guiding the roller.

Figure 1:
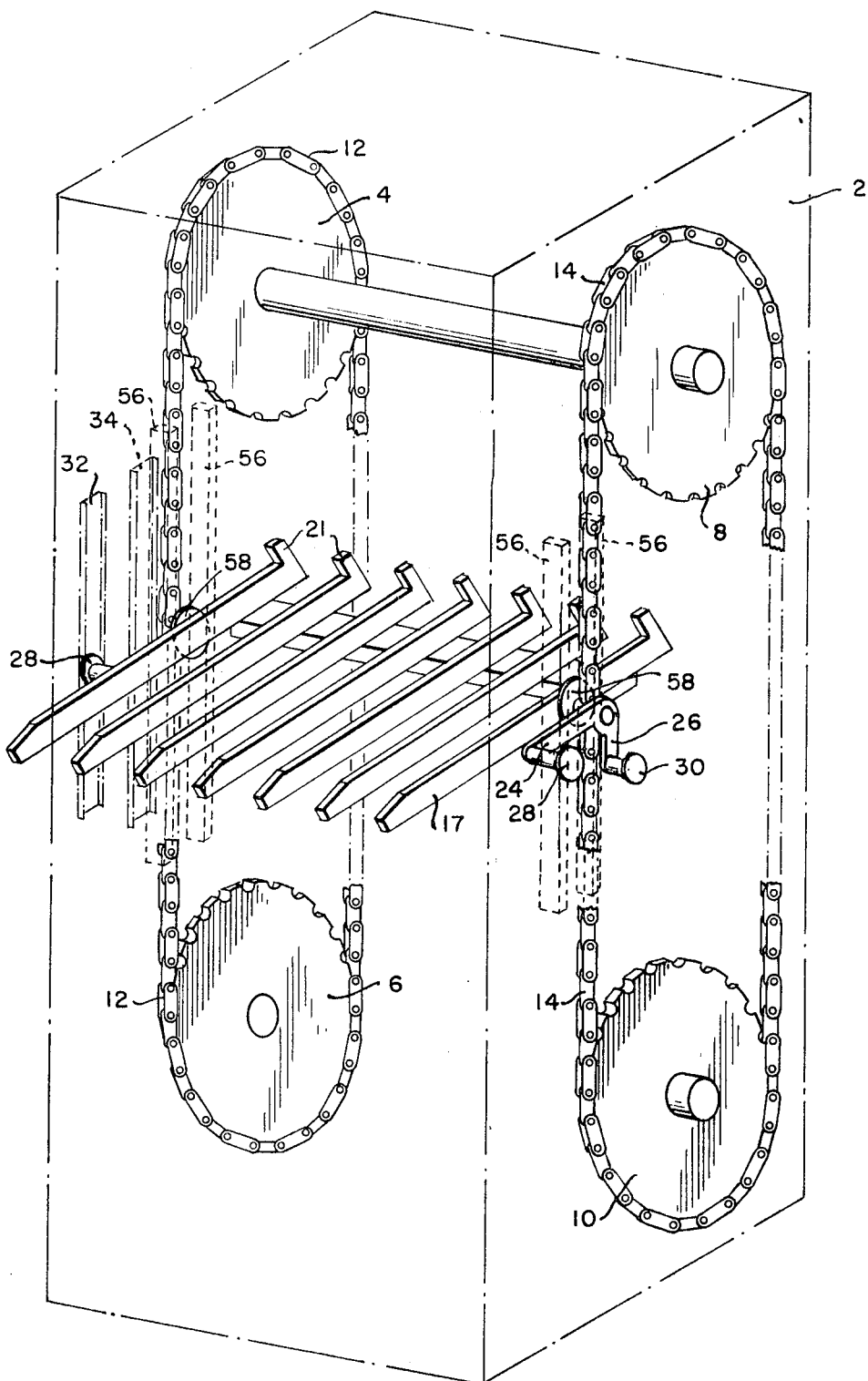
FIG. 1 is a perspective view of the conveyor of this invention.
Figure 2:
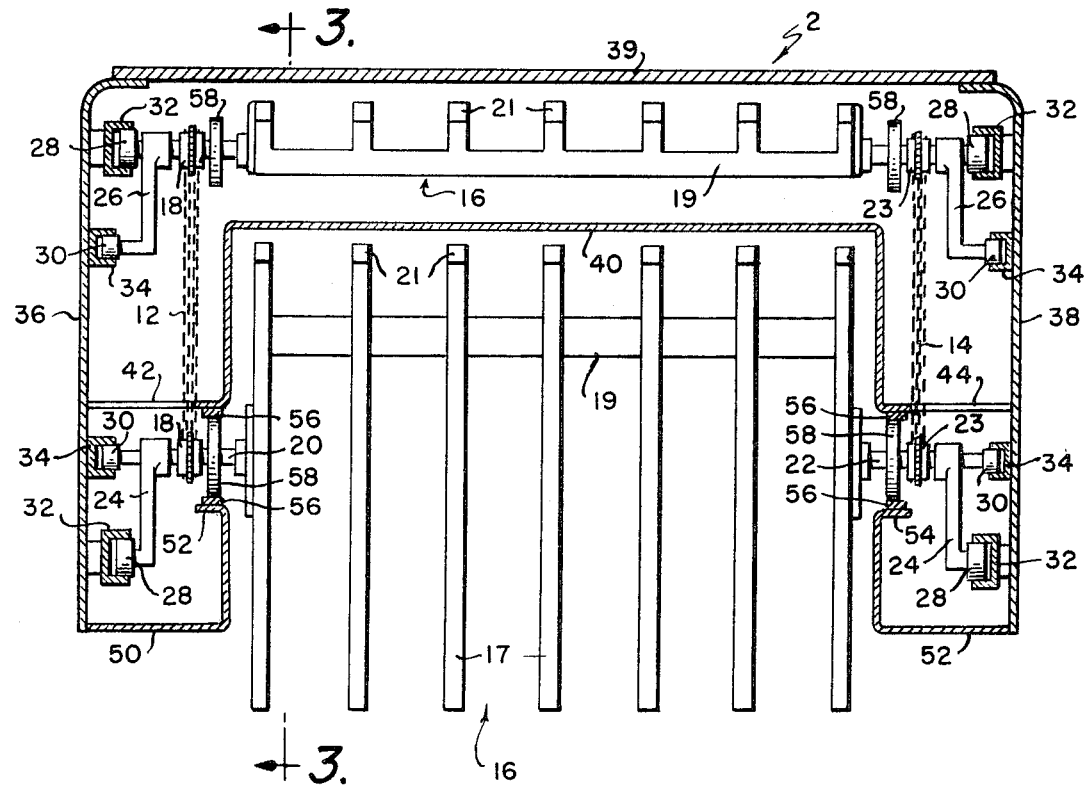
FIG. 2 is a cross-section through the conveyor at a point between stations.
Figure 3:
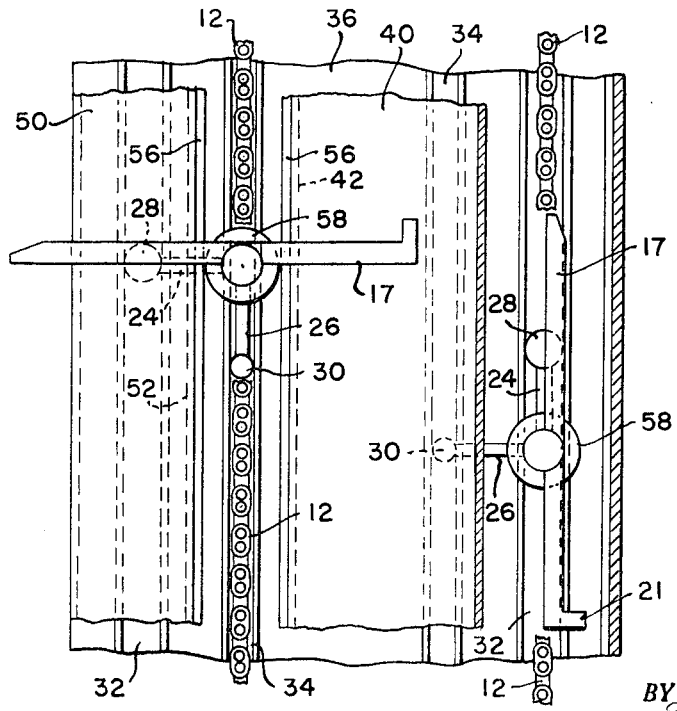
FIG. 3 is a section taken on line 3—3 of FIG. 2.

With reference to the drawing there is disclosed a conveyor comprising a framework or casing 2, shown diagrammatically in FIG. 1 by a broken outline, and a pair of sprockets 4 and 6 mounted adjacent one wall of the casing and a pair of sprockets 8 and 10 mounted adjacent the opposite wall. Chains 12 and 14 are trained over each pair of sprockets and the shelves 16 (only one being shown) are pivoted at 18 and 23 to the chains 12 and 14. The shelves comprise a plurality of angle bars 17 secured by welding to a common base bar 19. The pivoting structure comprises a shaft 20 fixed at one end to one side of the shelf and a shaft 22 fixed at one end to the opposite side. A bell crank having arms 24 and 26 is secured to the opposite end of each shaft. The arms 24 are provided with rollers 28 and the arms 26 are provided with rollers 30.

Figure 4:
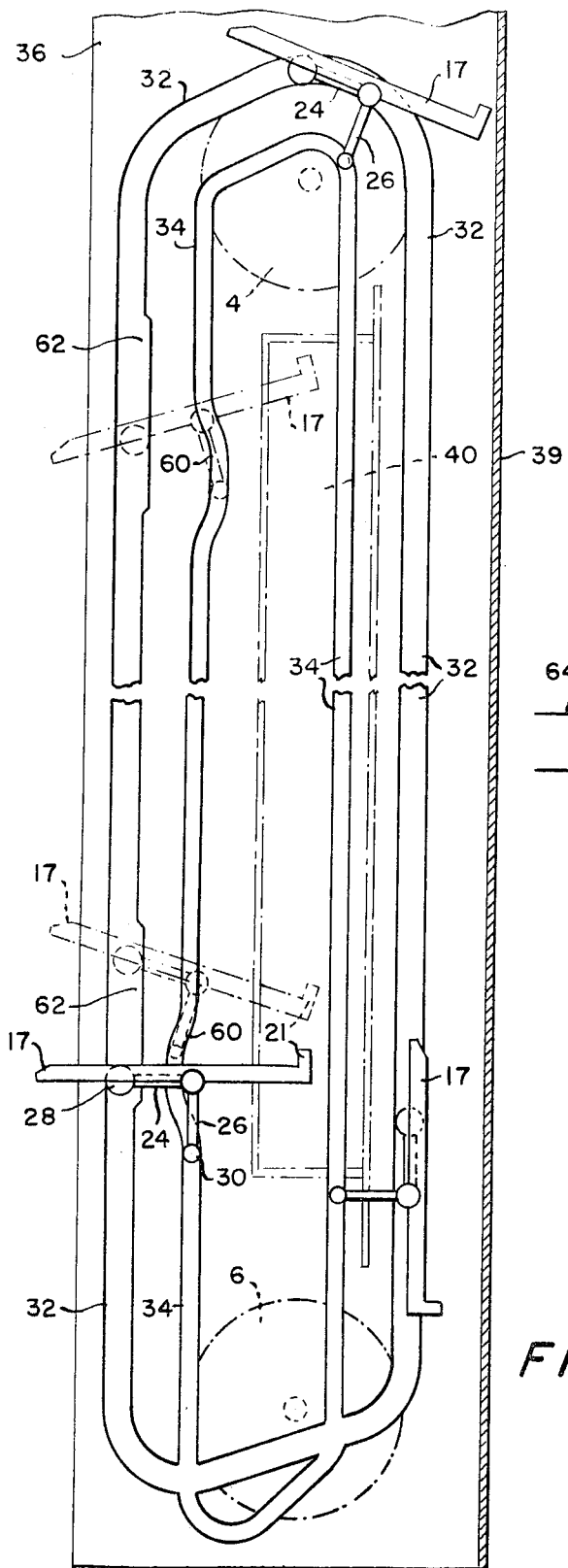
FIG. 4 is a diagrammatic view showing the profiles of the trackways for tilting the shelves.

A trackway comprising a pair of tracks 32 and 34 is mounted on opposed walls 36 and 38 of the casing and are of similar outlines as shown in diagrammatic form in FIG. 4. Each track is of channel cross-section and receives the rollers carried by the bell cranks. The profiles of the trackways are such as to rotate the bell cranks in a manner to orient the shelves in a manner noted below.

A channel shaped wall 40 having a pair of oppositely extending flanges 42,44 extends lengthwise of the casing and is secured between its ends to walls 36,38. An angle member 50 having a flange 52 opposed to flange 42 extends lengthwise of the casing and is secured to wall 36 as by welding. An angle member 52 having a flange 54 opposed to flange 44 extends lengthwise of the casing and is secured to wall 38. Walls 36,38, and 39 are mounted on a common base 46.

A guide rail 56 is secured to the opposed faces of the flanges and forms a trackway for rollers 58 which are rotatably mounted on shafts 20,22.

In the form of the invention illustrated in FIG. 4 the tracks 34 are provided with offset or curvilinear sections 60 and tracks 32 are provided with widened sections 62 at each loading and unloading station.

Figure 5:
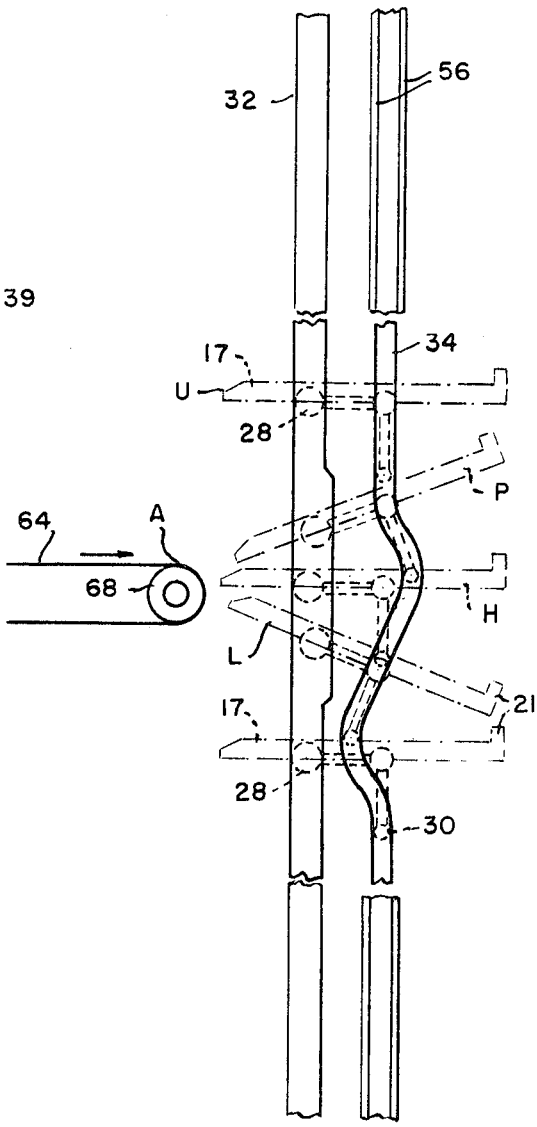
FIG. 5 is a diagrammatic view showing a segment of another profile of track.

In the form of the invention illustrated in FIG. 5 the curvilinear portion of the track is of serpentine profile.

While I have illustrated the widened sections 62 as being of substantially rectangular in profile it is contemplated that these sections can be formed with other profiles for controlling the roller 28.

In operation, the shelves are moved in orbital paths by powering either sprockets 4 and 8 or 6 and 10 to drive the chains 12 and 14. The bell crank levers are oriented by engagement of the rollers carried by arms 24 and 26 with tracks 32 and 34 to position the shelves. The shelves are tilted as shown in FIGS. 4 and 5 at each loading and unloading station. Forward tilting will cause the articles carried by the shelf to slide free of the conveyor. Rearward tilting will cause the articles to slide against the upstanding segments 21 of the bars 17. Between the stations the shelves are maintained horizontal and in the return run the shelves are vertical.

The programmed tilting of the shelves is produced by the profiles of the tracks. The rollers 58 guide shafts 20 and 22 in a horizontal axis which travels in a vertical plane coextensive with the center of the guideways formed by the spaced rails 56. The tilting of the shelves at each station is therefore confined to tilting about an axis through rollers 58 produced by the operation of the arm 26 by track 34. The geometry of the bell cranks dictates the dimensions of the portions 62 which permits the free movement of roller 38. The oscillation of shafts 20 and 22 are thus caused without applying a lateral strain on the chains whereby the deflection is eliminated and the tilting is exact and predictable.

In FIG. 4 I show a form of the invention in which articles are lifted from one station to another. The articles are loaded onto the shelf while it is in the horizontal position at the lower portion of the loading station and shifted against stops 21 by the tilting of the shelf. At the unloading station the shelf is tipped forward to discharge the articles.

In FIG. 5 I disclose a form of the invention in which a belt type conveyor is used in conjunction with the vertical conveyor described above. The belt 64 is trained about a pulley 68 and can be driven to load or unload the shelves. When used for lowering, the articles are fed (by means not shown) by the belt toward the shelf when it is in position H. The loading can continue till the shelf reaches position L. The tilting in the manner shown ensures that the articles are well placed on the shelf for lowering transport. When used to unload the tilting of the shelf from position U to position P will cause the article to slide by gravity onto the belt which will then be running in a direction to carry the article away. The serpentine profile is such that the load carrying surface of the shelf is maintained tipped toward a point A on the belt as it moves through the station and allows transfer of the articles in a smooth and shock free manner.

While I have shown in FIG. 4 a conveyor which is loaded at the lower level and unloaded at the upper level this arrangement can be reversed by exchanging the sections 60,62. This can be done by making these sections of tracks as independent units which can be separated from their mountings. It is to be understood that this form of the invention can be used with any desired loading-unloading unit.

In FIG. 5 the serpentine profile allows loading and/or unloading at a given station for loads that are being lowered. However, the shape of the profile can be reversed to provide for raising a load from one level to another.

I claim:

1. An article handling system for changing the speed of and transferring articles in a smooth and shockless manner, comprising: a predominately horizontally oriented article transfer support area at a transfer station; a conveyor member moving along a path having a path portion passing through the transfer station generally perpendicular to said article transfer support area and with a predominately vertical component of direction; means driving said conveyor member along said path portion past said article transfer support area at substantial relative speed; at least one shelf mounted on said conveyor member for bodily movement therewith along the path and having an article receiving edge; and cam and cooperating follower means for rotating said shelf relative to said conveyor member and relative to said article transfer support area at the transfer station so that said shelf article receiving edge dwells generally coextensive with respect to said article transfer support area during transfer at the transfer station during substantial vertical movement of said conveyor member along said path portion through the transfer station.

2. The system of claim 1, wherein said article transfer support area is substantially planar and said shelf article receiving edge dwells substantially in the plane of said article transfer support area.

3. The system of claim 1, wherein said shelf is coextensive with and adjacent said article transfer support area during only a small portion of the dwell.

4. The system of claim 3, wherein said cam and cooperating follower means generally pivots said shelf about said shelf article receiving edge between positions on opposite sides of the coextensive position and maintains said shelf article receiving edge substantially stationary with respect to said article transfer support area during the dwell.

5. The system of claim 1, wherein said conveyor member is endless and moves in a fixed closed path within a generally vertical plane, and further includes journal means mounting said shelf for relative pivotal movement about an axis at all times perpendicular to said closed path plane; said cam and cooperating follower means includes a first stationary guide track parallel with said path at said transfer station and follower means coaxial with said axis for engaging said first guide track at said transfer station to prevent movement of said journal means transverse to said path; and said cam and cooperating follower means further includes a second stationary guide track parallel with said path plane and non parallel with said first stationary guide track at said transfer station, and second follower means on said shelf spaced from said journal means axis for engaging said second guide track at said transfer station to pivot said shelf about said journal means axis with respect to said conveyor member so that said shelf rotates in a plane parallel to said path portion, perpendicular to said article transfer support area at the transfer station and generally perpendicular to said shelf edge.

* * * * *